United States Patent [19]
Price

[11] 3,789,702
[45] Feb. 5, 1974

[54] VACUUM CONTROL FOR CARBURETOR POWER ENRICHMENT APPARATUS
[75] Inventor: Robert T. Price, Berkley, Mich.
[73] Assignee: General Motors Corporation, Detroit, Mich.
[22] Filed: Mar. 15, 1972
[21] Appl. No.: 234,897

[52] U.S. Cl. .............................. 74/859, 123/119 R
[51] Int. Cl. .... B60k 21/00, F02b 33/00, F02m 7/00
[58] Field of Search .. 123/119 R, 127, 106; 74/859, 74/860

[56] References Cited
UNITED STATES PATENTS
| | | | |
|---|---|---|---|
| 2,473,762 | 6/1949 | Mallory | 123/106 |
| 3,685,502 | 8/1972 | Oberdorfer | 123/119 R |
| 3,691,873 | 9/1972 | Lombard et al. | 74/860 X |
| 2,362,655 | 11/1944 | Mallory | 74/860 |
| 3,349,644 | 10/1967 | Gish | 74/860 |
| 3,587,651 | 6/1971 | McCollough | 123/103 R |
| 3,696,798 | 10/1972 | Bishop et al. | 123/119 R X |

Primary Examiner—Allan D. Herrmann
Assistant Examiner—P. S. Lall
Attorney, Agent, or Firm—R. L. Phillips

[57] ABSTRACT

A solenoid valve is normally opened to bleed a part of the engine vacuum applied to operate the power enrichment system of an internal combustion engine carburetor. A transmission controlled switch closes the solenoid valve when the transmission shifts to a high drive ratio from a lower drive ratio. Since the power system varies the flow of enriched fuel inversely with engine vacuum, closure of the valve delays the commencement of fuel enrichment until the engine vacuum falls below a level lower than that at which enrichment is normally commenced with the valve open.

3 Claims, 4 Drawing Figures

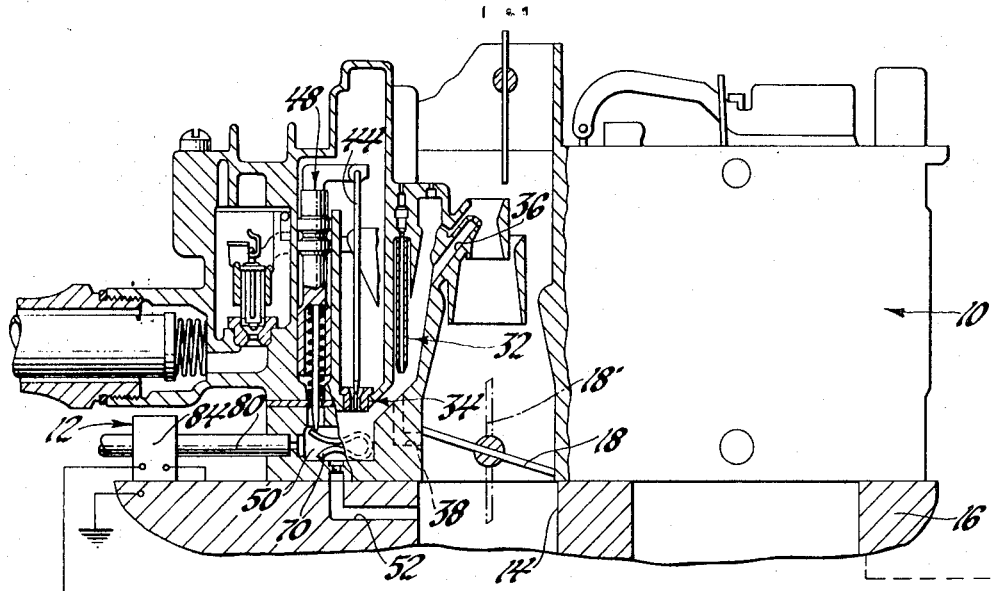
Fig. 1
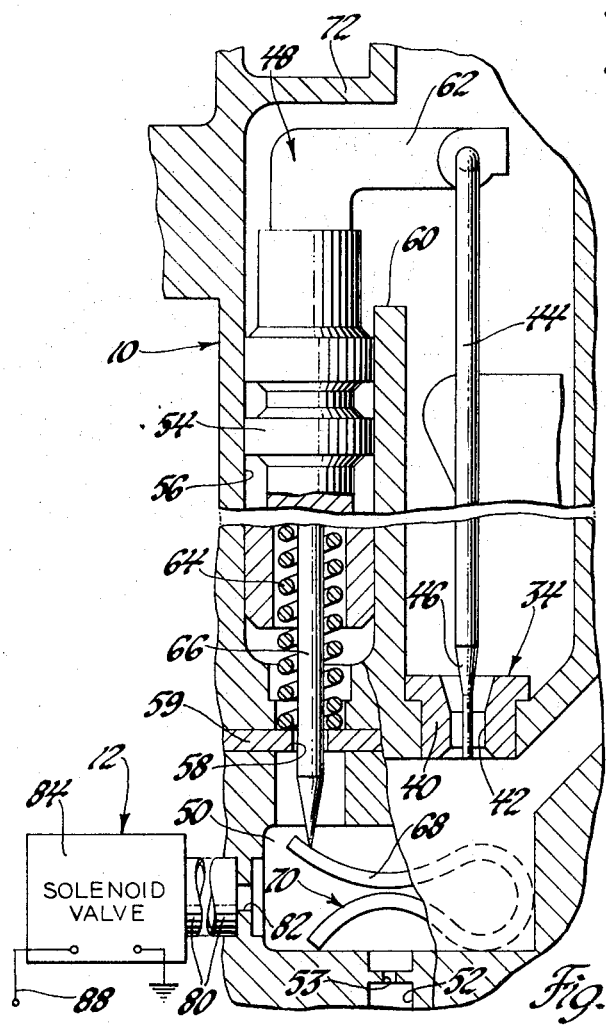
Fig. 2
Fig. 3
Fig. 4

VACUUM CONTROL FOR CARBURETOR POWER ENRICHMENT APPARATUS

This invention relates to power enrichment systems for internal combustion engine carburetors and particularly to power enrichment systems operated in accordance with engine vacuum.

One common method of improving fuel economy in a vehicle powered by an internal combustion engine has involved using transmission overdrive arrangements to reduce the number of engine revolutions per wheel revolution. Other methods have involved lowering the axle ratio. In each case the ratio of engine speed to road speed, also called the N/V ratio, has been lowered. However, while lowering the N/V ratio usually improves fuel economy, it has been found that significant improvements in fuel economy are not readily obtainable as the N/V ratios drop to 30.

The present invention recognizes that one reason for this loss of extra economy is that, in comparable driving conditions, the engine vacuum is normally reduced as the N/V ratio is lowered and that the power enrichment system in the usual commercial carburetor, since it enriches fuel flow with decreasing engine vacuums, is therefore used for a greater proportion of the time in normal maneuvers. Such greater use of the power enrichment systems in normal cruise driving prevents the attainment or potential fuel economy that might otherwise be realized by lowering the N/V ratio. The present invention further recognizes that normal operation of the power enrichment system may not be necessary during normal expressway or highway driving of vehicles having low N/V ratios.

Loss of some of the potential fuel economy otherwise obtainable by lowering the N/V ratio is avoided in the present invention by a solenoid valve that normally allows some of the engine vacuum for operating the power enrichment system of an internal combustion engine carburetor to bleed off when the vehicle transmission is not in high gear. When the transmission shifts to a high drive ratio, the solenoid valve is closed by a transmission controlled switch that is already available to control the application of engine vacuum to a vacuum advance unit on the engine timing distributor to permit vacuum advanced ignition timing. Since the power enrichment system varies the flow of enriched fuel to the engine inversely with engine vacuum, closure of the solenoid valve delays the commencement of fuel enrichment until the engine vacuum falls below a level lower than that at which enrichment is normally commenced with the valve open.

It is an object of the present invention to provide a new and improved power enrichment system for an internal combustion engine carburetor.

It is another object of the present invention to provide, in an internal combustion engine carburetor having a power enrichment system for varying the flow of enriched fuel inversely with engine vacuum, a vehicle speed controlled apparatus for operating the power enrichment system with more of the available engine vacuum with increasing vehicle speeds.

It is another object of the present invention to provide, in an internal combustion engine combustion for varying the flow of enriched fuel to the engine inversely with varying engine vacuums, vehicle speed controlled apparatus for delaying the commencement of enriched fuel flow until the engine vacuum falls below a level lower than the level at which fuel enrichment is normally commenced.

It is another object of the present invention to provide a vehicle speed controlled apparatus of the foregoing type wherein a portion of the engine vacuum otherwise available for operating the power enrichment system is normally exhausted through a solenoid valve that is closed by a switch actuated by the shift of the vehicle transmission to a high drive ratio, the higher vacuum applied to the power enrichment system with the valve closed in high gear reducing the flow of enriched fuel and improving fuel economy.

It is another object of the present invention to provide a power enrichment system of the foregoing type wherein the switch for closing the solenoid valve also controls a vacuum advanced ignition timing system.

These and other objects and features of the present invention will become more apparent with reference to the following description taken in conjunction with the accompanying drawings wherein:

FIG. 1 is a cross-section of a carburetor having power enrichment apparatus incorporating a transmission controlled vacuum bleed control system provided in accordance with the present invention:

FIG. 2 is a view showing the power enrichment apparatus of FIG. 1 in greater detail;

FIG. 3 shows the air/fuel versus engine vacuum characteristics obtained when the vacuum bleed of the carburetor in FIGS. 1 and 2 is open in high gear and when it is closed; and FIG. 4 shows the fuel economy versus vehicle speed characteristics obtained at given engine vacuums when the carburetor of FIGS. 1 and 2 provides fuel to the engine of the vehicle with the vacuum bleed open and with the bleed closed.

With reference now to FIG. 1, there is shown partly in outline a carburetor 10 incorporating a transmission controlled vacuum bleed control system 12 provided in accordance with the present invention and described in further detail below. Carburetor 10 provides an air-fuel mixture to an induction passage 14 of an internal combustion engine 16 under the control of a throttle valve 18. Engine 16 is connected to drive the vehicle wheels 20 and 22 through an automatic transmission 24, a differential 26 and axles 28 and 30. To provide fuel to meet the demands of engine 16, carburetor 10 has a fuel delivery passage denoted generally at 32 that includes fuel metering means 34, primary fuel delivery channel 36, and an idling channel 38.

Fuel metering means 34 further includes a valve seat 40 having a central orifice 42 therethrough and a metering rod 44 having a tapered end 46 extending through orifice 42. A power enrichment system 48 is provided to normally position tapered end 46 in orifice 42 in accordance with a varying engine vacuum communicated from induction passage 14 to a vacuum chamber 50 through a vacuum channel 52 and a flow restriction 53, the purpose of which is described below. To increase the flow of enriched fuel through orifice 42 as the engine vacuum in induction passage 14 decreases, enrichment system 48 includes a piston 54 translatable in a piston chamber 56, one end of which communicates with vacuum chamber 50 through an opening 58 in a plate 59 and the other end of which has an opening 60 for communicating with atmospheric pressure normally upstream of metering means 34. The upper end of piston 54 as viewed in FIG. 2 has an arm 62 extending through opening 60 for positioning and pivotably supporting metering rod 44. A spring 64 biases the bottom of piston 54 upwards from plate 59 so as to cause arm 62 to retract tapered end 46 of metering rod 44 out of orifice 42 and thereby increase the flow area therethrough. As the vacuum in vacuum chamber 50 increases, the pressure differential between the top and bottom sides of piston 54 acts against the upward bias of spring 64 to translate piston 54 downwards until an adjustment rod 66 secured to the bottom of piston 54 and extending through opening 58 in plate 59 abuts against one leg 68 of adjustment clip 70 located in vacuum chamber 50. Clip 70 thus stops further downward translation of piston 54 and maintains a minimum flow area through orifice 42 as the engine vacuums increase above a predetermined level. As the engine vacuum falls below this level, spring 64 urges piston 54 upwards until piston arm 62 abuts roof 72 at which point rod 66 determines the maximum flow area through orifice 42. The above described power system 48 may be of the conventional type in operation described on page 6–60 of the "1972 Cadillac Shop Manual" published by the General Motors Corporation.

It has been found that as the engine 16, transmission 24 and differential 26 are sized to require fewer engine revolutions per mile per hour of vehicle speed, thereby lowering what is called the N/V ratio, the engine vacuum in induction passage 14 is normally reduced for comparable driving conditions, especially under normal expressway or open highway cruising conditions where the N/V ratio of a given vehicle is usually the lowest. Therefore, unless its normal operation is prevented under these cruise conditions, power system 48 would otherwise provide a flow of enriched fuel merely because of the vacuum-reducing effect of the lowered N/V ratio and not because the operator of the vehicle desired the increased performance normally associated with power enrichment. Since it has also been found that adequate vehicle performance is obtained under these cruise conditions without any flow of enriched fuel, fuel economy is obtained with vacuum bleed control system 12 of the present invention by delaying the commencement of operation of power system 48 at high vehicle speeds until the engine vacuum drops to a level lower than that at which the power system 48 normally commences operation at lower speeds.

Since high speed operation of the vehicle is usually effected when the drive ratio between the revolutions of output shaft 23 of transmission 24 to the revolutions of input shaft 25 thereof is the highest, vacuum bleed control system apparatus 12 is activated to prevent the normal operation of power system 48 when transmission 24 is shifted into its high drive ratio from a lower drive ratio. For this purpose, vacuum bleed control system 12 includes a conduit 80, one end of which communicates with vacuum chamber 50 in carburetor 10 through a flow restriction 82, a commercially available solenoid valve 84 for exhausting the other end of conduit 80 to atmosphere, a transmission controlled switch 86 mounted on and operated by transmission 24, and a conductor 88 for energizing solenoid valve 84 with power from a vehicle battery 90. These components cooperate so that with transmission 24 in a low drive ratio, transmission controlled switch 86 is normally deenergized and solenoid valve 84 is normally open to bleed the vacuum in vacuum chamber 50 at rates varying with the vacuum and the sizes of restrictions 53 and 82. When in a high drive ratio, transmission 24 closes transmission controlled switch 86 to energize solenoid valve 84 thereby stopping the bleed of vacuum from vacuum chamber 50 through conduit 80.

Also connected by a conductor 92 to transmission controlled switch 86 is an ignition timing system 94 which may be of the type described in U.S. Pat. No. 3,584,521, entitled "Ignition Timing Arrangement" issued to Richard Tooker and James Dawson on June 15, 1971, assigned to the assignee of the present invention, and hereby incorporated herein by reference. As more fully described in the Tooker et al. patent, timing system 94 has a valve operated by a switch such as switch 86 for controlling the communication of engine vacuum to a vacuum advance unit on the vehicle ignition distributor so as to permit vacuum advanced ignition timing when the transmission is in a high drive. Such advanced timing has been found advantageous in reducing automotive exhaust emissions, unburned hydrocarbons and oxides of nitrogen. As also shown in the Tooker et al. patent, transmission controlled switch 86 may be controlled in accordance with vehicle speed as determined by a signal from a governor on the output shaft of the transmission or may be controlled by a drive ratio shift valve in the transmission.

In normal operation of power enrichment system 48, the position of metering rod 44 is varied in accordance with the varying engine vacuum in induction passage 14 to vary the flow area through orifice 42 between a minimum and a maximum. Metering rod 44 is positioned to effect the minimum flow area when the magnitude of the vacuum in vacuum chamber 50 is sufficient to hold rod 66 against clip leg 68 against the upward bias of spring 64. When in this minimum flow area position, metering means 34 still permits fuel to flow at a rate determined by the pressure drop between the substantially atmospheric pressure on the up-stream side of orifice 42 compared to the downstream pressure in either primary delivery passage 36 when throttle valve 18 is in an open position 18' shown dotted or in idle passage 38 when throttle valve 18 is in an idle position shown solid. With the throttle valve 18 open, the flow of fuel through metering means 34 when in the minimum flow area condition is normally sufficient to sustain non-enriched vehicle operation under constant loads, and with throttle valve 18 closed in its idle position, the flow of fuel through metering means 34 is normally sufficient to sustain idle operation of engine 16.

Transmission controlled switch 86 is normally open in this normal operation of power system 48 so that solenoid valve 84 is normally deenergized and open to bleed the vacuum in vacuum chamber 50. Restriction 53 cooperating to some extent with restriction 82 restricts the loss of engine vacuum available in induction passage 14 when solenoid valve 84 is open. Restriction 82 also cooperates with spring 64 to determine the level below which the engine vacuum must fall before the pressure differential across piston 54 is sufficient to allow spring 64 to retract metering rod 44. For example, with bleed valve 84 open, the carburetor 10 and power system 48 of FIGS. 1 and 2 provide a lean or economy mixture until the engine vacuum is 11 inches of mercury, a full power or rich mixture at a vacuum of 5 inches, and a mixture halfway between lean and rich at a vacuum of 8 inches, thereby also providing an air fuel ratio versus induction passage characteristic similar to that indicated by the dotted line in FIG. 3.

The above described normal operation of power system 48 is prevented while also permitting vacuum advanced timing in ignition timing system 94 when transmission 24 shifts to a high drive ratio to close transmission controlled switch 86 and there-through energize solenoid valve 84 to cut off the bleed through conduit 80. The pressure differential across piston 54 is then increased by the amount of vacuum normally bled through conduit 80 to correspondingly advance metering rod 44 into orifice 42 and reduce the flow area therethrough.

As may be better understood with reference to FIG. 3, by closing the bleed to vacuum chamber 50, vacuum bleed control system 12 is operative to lower from 11 inches of mercury to 6 inches the level of vacuum required in induction passage 14 for the commencement of fuel enrichment. The commencement of enriched fuel is thus delayed until the engine vacuum has dropped to a level lower than that at which enriched fuel flow would be provided with the bleed open. Such delay in the attainment of the vacuum level required for power cut-in causes a leaner air fuel mixture to result at given levels of vacuum during the delay. Thus, closing bleed valve 84 in carburetor 10 of FIGS. 1 and 2 provides a lean or full economy mixture until the vacuum drops to 6 inches and full power or rich mixture at 4 inches, as indicated by the solid air-fuel ratio versus engine vacuum characteristic of FIG. 3. Since running on leaner mixtures normally results in fuel economy, such economy may be obtained by the vacuum bleed control of the present invention for manifold vacuums between 4 inches and 11 inches. For example, a commercial passenger vehicle fitted with a four-speed overdrive transmission provided fuel economy versus vehicle speed characteristics similar to those shown in FIG. 4 when using a four barrel carburetor 10 as shown in FIGS. 1 and 2 and having the air fuel ratio versus vacuum characteristics similar to those shown in FIG. 3. The upper limit of fuel economy for each vacuum level shown was obtained by allowing the bleed valve 84 to be closed in the fourth gear in accordance with the present invention and the lower limit was obtained by preventing such closure in the fourth gear as by disconnecting conductor 88.

Having described one embodiment of the present invention, it is understood that the specific terms and examples are employed in a descriptive sense only and not for the purposes of limitation. Other embodiments of the present invention, modifications thereof and alternatives thereto may be used. I therefore aim in the appended claims to cover such modifications and changes as fall within the true spirit and scope of my invention.

What is claimed is:

1. In combination with an internal combustion engine providing a source of variable engine vacuum and a carburetor providing an air fuel mixture to said engine:
   a. fuel metering valve means operable to normally increasingly enrich the fuel flow to said engine as said variable engine vacuum decreases below a first predetermined vacuum level; and
   b. vacuum control means responsive to a signal indicating vehicle speed and including energizable solenoid valve means and transmission controlled switch means for energizing said solenoid valve means, said transmission controlled switch means having a first condition for causing said solenoid valve means to normally allow said metering valve means to normally enrich said fuel flow and second condition for causing said solenoid valve means to delay said fuel metering valve means from enriching fuel flow until said engine vacuum decreases below a second predetermined vacuum level less than said first predetermined level.

2. In combination with an internal combustion engine providing a source of variable engine vacuum and a carburetor for providing an air fuel mixture to said engine:
   a. a vacuum unit for advancing the timing of ignition in said engine when said vacuum is communicated to said vacuum unit;
   b. fuel metering valve means operable to normally increasingly enrich the fuel flow to said engine as said variable engine vacuum decreases below a first predetermined vacuum level;
   c. solenoid valve means operable to normally allow said metering valve means to normally enrich said fuel flow and to otherwise prevent said fuel metering valve means from enriching said fuel flow until said engine vacuum decreases below a second predetermined vacuum level less than said first level; and
   d. control means responsive to a signal indicating vehicle speed for controlling said solenoid valve means and said vacuum advance unit and having a first condition operable to normally prevent said vacuum from being communicated to said vacuum unit while also causing said solenoid means to normally allow said metering valve means to normally enrich said fuel flow and having a second condition for permitting said vacuum to be communicated to said vacuum unit while also causing said solenoid to prevent said fuel metering valve means from enriching said fuel flow until said engine vacuum decreases below a second predetermined vacuum level less than said first predetermined level.

3. In combination with an internal combustion engine for providing a source of variable engine vacuum signals and a carburetor for providing an air fuel mixture to said engine:
   a. a transmission with an input connected to said engine and an output connected to a load, said transmission having variable drive ratio means for varying the ratio of the speed of the output to the speed of the input from a high drive ratio to a lower drive ratio;
   b. fuel metering valve means operable to normally increasingly enrich the fuel flow to said engine as said engine vacuums decrease below a first predetermined vacuum level, said fuel metering valve means normally enriching said fuel flow by providing a flow area increasing from a minimum to a maximum flow area as said vacuum decreases below said first level;
   c. solenoid valve means operable to normally allow said fuel metering valve means to normally enrich said fuel flow and to otherwise prevent said fuel metering valve means from providing a flow area between said minimum and maximum flow areas until said engine vacuums decrease below a second predetermined vacuum level less than said first level; and d. transmission controlled switch means having a first condition for causing said solenoid valve means to normally allow said fuel metering valve means to normally enrich said fuel flow and a second condition when said transmission is in said high drive ratio to cause said solenoid valve means to prevent said fuel metering valve means from increasing said flow area between said minimum and maximum flow areas until said engine vacuums decrease below said second predetermined level.

* * * * *